United States Patent
Kim et al.

(10) Patent No.: US 10,889,212 B2
(45) Date of Patent: Jan. 12, 2021

(54) VENTILATION SEAT FOR VEHICLES

(71) Applicant: HYUNDAI TRANSYS INC., Seosan-si (KR)

(72) Inventors: Do Hyung Kim, Yongin-si (KR); Ho Sub Lim, Seoul (KR); Sung Bin Jeong, Yongin-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 16/542,856

(22) Filed: Aug. 16, 2019

(65) Prior Publication Data
US 2020/0094716 A1 Mar. 26, 2020

(30) Foreign Application Priority Data
Sep. 20, 2018 (KR) .................. 10-2018-0113024

(51) Int. Cl.
*B60N 2/56* (2006.01)
*B60N 2/58* (2006.01)
*A47C 7/74* (2006.01)

(52) U.S. Cl.
CPC .......... *B60N 2/5657* (2013.01); *B60N 2/5642* (2013.01)

(58) Field of Classification Search
CPC ............................ B60N 2/5642; B60N 2/5657
USPC ............................ 297/180.13, 180.14, 452.42
See application file for complete search history.

(56) References Cited

U.S. PATENT DOCUMENTS

| | | | | |
|---|---|---|---|---|
| 5,902,014 A * | 5/1999 | Dinkel | ................. | B60N 2/5635 297/180.13 X |
| 6,277,023 B1 * | 8/2001 | Schwarz | .............. | B60N 2/5635 297/180.14 |
| 7,607,739 B2 * | 10/2009 | Browne | ............... | B60N 2/5621 297/180.14 X |
| 7,665,803 B2 * | 2/2010 | Wolas | ..................... | A47C 7/748 297/180.13 |
| 7,857,395 B2 * | 12/2010 | Kikuchi | .............. | B60R 11/0264 297/452.47 |
| 8,777,320 B2 * | 7/2014 | Stoll | .................... | B60N 2/5635 297/452.42 |
| 9,415,712 B2 * | 8/2016 | Stoll | ...................... | B60N 2/565 |

(Continued)

FOREIGN PATENT DOCUMENTS

| | | |
|---|---|---|
| JP | 11-313730 A | 11/1999 |
| JP | 2003-285628 A | 10/2003 |

(Continued)

OTHER PUBLICATIONS

Korean Office Action dated Oct. 8, 2019; Appln, No. 10-2018-0113024.

*Primary Examiner* — Rodney B White

(57) ABSTRACT

Disclosed is a ventilation mat for vehicles in which at least one exhaust hole configured to be spaced apart from a channel of a ventilation mat of a seat back and communicate with a covering layer is formed through the ventilation mat so as to form an exhaust air circulation structure to uniformly maintain ventilation performance of the seat back regardless of physical characteristics of a passenger seated on a seating part of the seat back. Therefore, through the exhaust air circulation structure, the ventilation mat for vehicles consistently inhales cooling air in a vehicle when the passenger is seated on the ventilation seat, and thus lowers the temperature of the seating part to improve passenger's thermal comfort.

12 Claims, 5 Drawing Sheets

(56) References Cited

U.S. PATENT DOCUMENTS

| | | | | |
|---|---|---|---|---|
| 2006/0138811 A1* | 6/2006 | Pfahler | ................ | B60N 2/5635 297/180.14 |
| 2006/0175877 A1* | 8/2006 | Alionte | ................ | B60N 2/5635 297/180.14 |
| 2007/0001506 A1* | 1/2007 | Stowe | ................ | B60N 2/5657 297/452.42 |
| 2007/0040421 A1* | 2/2007 | Zuzga | ................ | B60N 2/5657 297/180.13 |
| 2015/0329027 A1* | 11/2015 | Axakov | ................ | B60N 2/565 297/180.13 |

FOREIGN PATENT DOCUMENTS

| | | |
|---|---|---|
| KR | 101483867 B1 | 1/2015 |
| KR | 101525766 B1 | 5/2015 |
| KR | 1020160136858 A | 11/2016 |

* cited by examiner

VENTILATION SEAT FOR VEHICLES

CROSS-REFERENCE TO RELATED APPLICATION

This application claims the benefit of priority under 35 U.S.C. § 119(a) to Korean Patent Application No. 10-2018-0113024 filed on Sep. 20, 2018, the entire contents of which are incorporated herein by reference.

BACKGROUND

(a) Technical Field

The present disclosure relates generally to a ventilation seat for vehicles. More particularly, it relates to a ventilation seat for vehicles which may provide effective ventilation performance when a passenger is seated on the seat.

(b) Background Art

A seat for vehicles may be generally divided a seat cushion corresponding to a seating face part supporting a load of the lower body of a passenger, and a seat back corresponding to a back part supporting the upper back of the passenger.

Recently, various ventilation seat technologies are applied to passengers seated on vehicle seats for convenience.

For example, FIG. 1 illustrates that ventilation mat 10 provided with an air flow path is disposed on a seat back, and the flow path of the ventilation mat 10 is connected to a duct connected to an air supply apparatus so as to discharge air to a passenger.

Particularly, a sponge-type pad 20 which is close to a channel 11 is adhered to the outer surface of the ventilation mat 10, i.e., a surface of the ventilation mat 10 on which a passenger is seated, and ventilation holes 21 communicating with the channel 11 of the ventilation mat 10 are formed through the pad 20. Further, air permeable filter foam 30 is stacked on the outer surface of the pad 20, and then an obtained stack structure is covered with a covering 40 formed of leather or fabric to form the outer appearance of a seat, thereby completing a seat structure.

Here, fine holes 41 are formed through the covering 40 and air is discharged to the passenger through such fine holes. In short, air transmitted to the permeable filter foam 30 from the air supply apparatus through the ventilation holes 21 of the pad 20 is discharged to the outside of the seat through the fine holes 41 formed through the covering 40, as exemplarily shown in FIG. 1.

In the seat, an air circulation direction is changed according to seating conditions of the passenger. FIG. 1 illustrates a state in which the fine holes 41 of the covering 40 are blocked by the passenger's body. In this case, ventilation performance is remarkably reduced as compared to a case in which no passenger is seated on the seat and may influence passenger's thermal comfort in a negative way. Although FIG. 1 illustrates that air is discharged through the fine holes 41 located at the right, which are not closed by the passenger's body, when all the fine holes 41 are closed, ventilation performance is rapidly lowered.

Particularly, while ventilation performance of the seat cushion can be minimally maintained due to an open space between passenger's thighs when a passenger is seated on the seat, ventilation performance of the seat back is greatly lowered.

SUMMARY OF THE DISCLOSURE

Embodiments of the present disclosure have been made in an effort to solve the above-described problems associated with the related art. The present disclosure provides a ventilation seat including an exhaust air circulation structure which may uniformly maintain ventilation performance of a seat back regardless of physical characteristics of a passenger. The exhaust air circulation structure solves the hole blocking problem by consistently inhaling cooling air in a vehicle when the passenger is seated on the ventilation seat and lowering the temperature of the seating part to improve passenger's thermal comfort.

In one aspect, a ventilation seat for vehicles includes a ventilation mat including an air intake and a channel configured to move air inhaled through the air intake, a pad including at least one ventilation hole configured to communicate with at least a part of the channel of the ventilation mat, and a covering layer configured to discharge air moved through the at least one ventilation hole of the pad to the outside of a seat back, wherein at least one exhaust hole configured to be spaced apart from the channel of the ventilation mat and communicate with the covering layer is formed through the ventilation mat.

Other aspects and embodiments are discussed infra.

The above and other features of the disclosure are discussed infra.

BRIEF DESCRIPTION OF THE DRAWINGS

The above and other features of the present disclosure are described in detail with reference to certain exemplary embodiments thereof illustrated in the accompanying drawings which are given hereinbelow by way of illustration only, and thus are not limitative of the present disclosure, and wherein.

Figure 1:
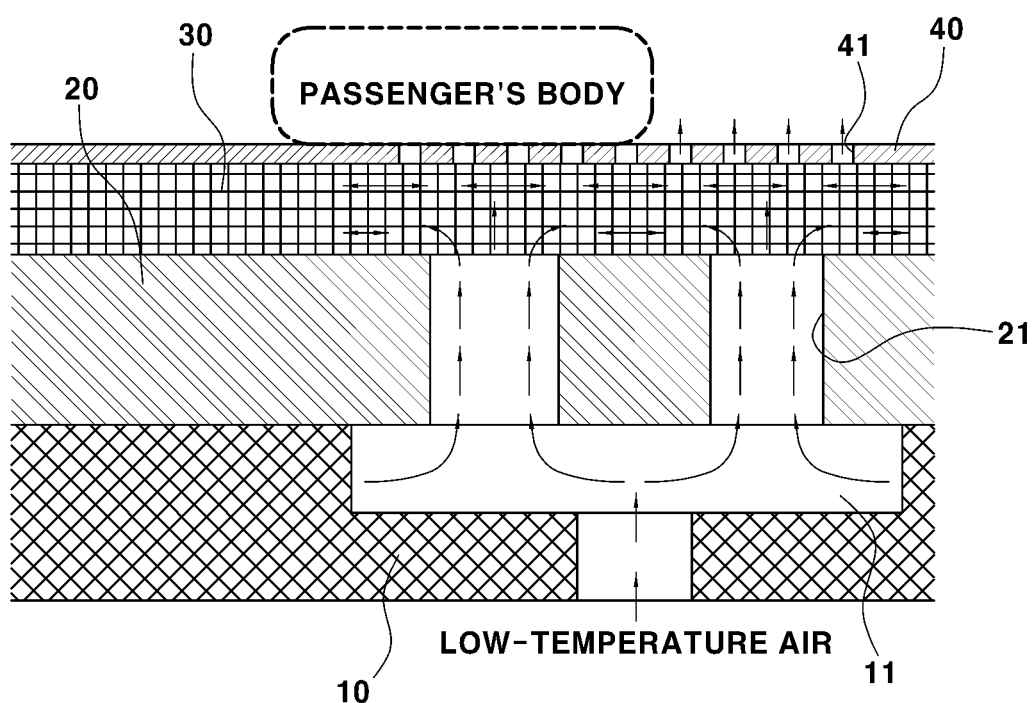
FIG. 1 is a view schematically illustrating a conventional ventilation seat in which fine holes of a covering are closed by a passenger and thus ventilation performance is degraded.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts throughout the several figures of the drawing.

DETAILED DESCRIPTION

Hereinafter reference will now be made in detail to various embodiments of the present disclosure, examples of which are illustrated in the accompanying drawings and described below. While the technology will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments within the spirit and scope of the disclosure as defined by the appended claims.

Figure 2:
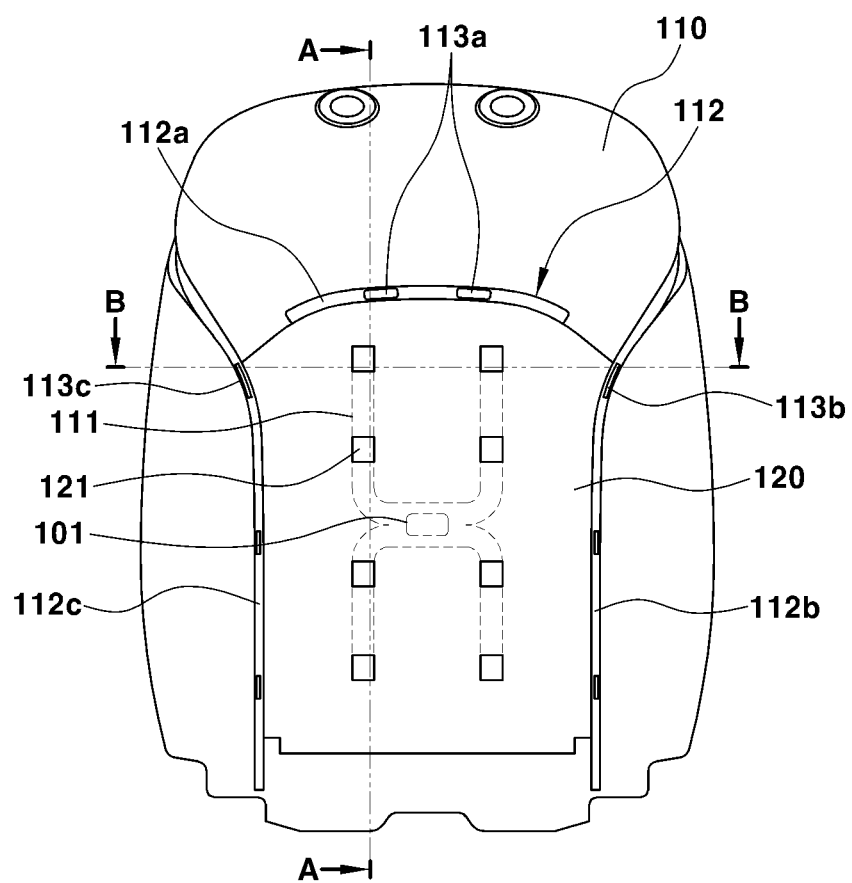
FIG. 2 is a view illustrating a seat back ventilation structure of a ventilation seat for vehicles in accordance with one embodiment of the present disclosure.
Figure 3:
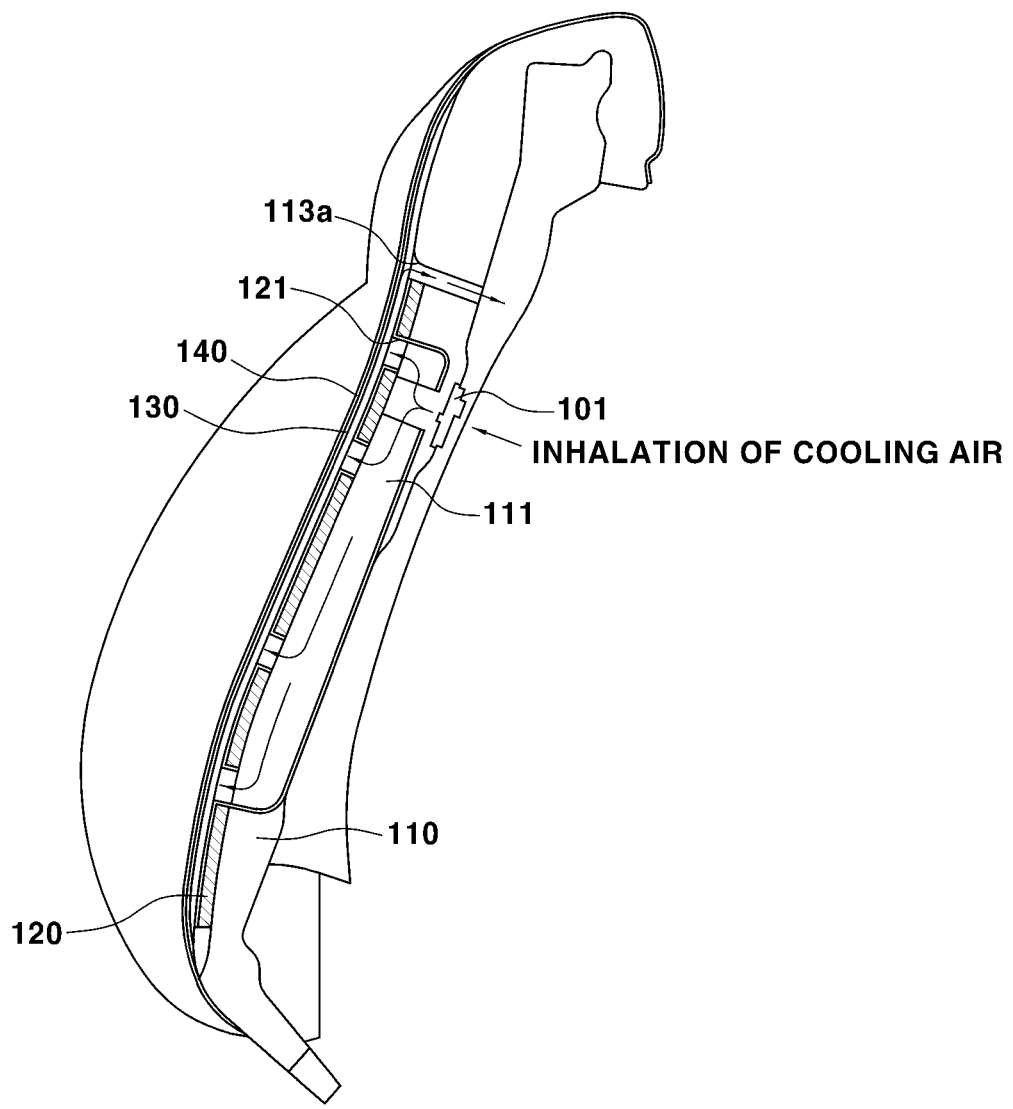
FIG. 3 is a cross-sectional view of the seat back ventilation structure of FIG. 2, taken along line A-A'.
Figure 4:
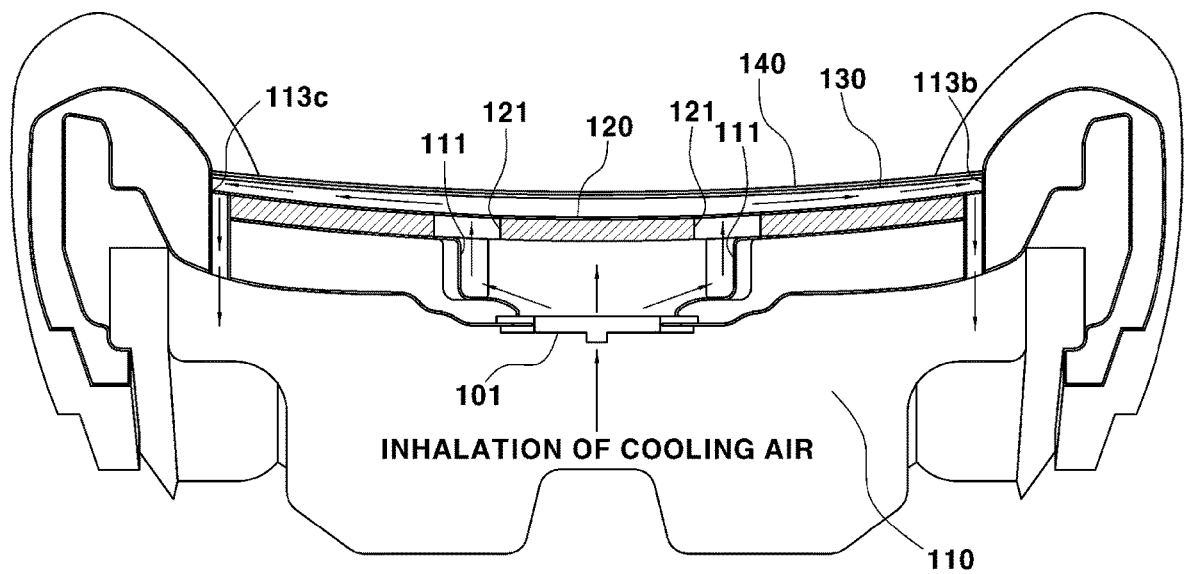
FIG. 4 is a cross-sectional view of the seat back ventilation structure of FIG. 2, taken along line B-B'.

FIG. 2 is a view illustrating a seat back ventilation structure of a ventilation seat for vehicles in accordance with one embodiment of the present invention, FIG. 3 is a cross-sectional view of the seat back ventilation structure of FIG. 2, taken along line A-A', and FIG. 4 is a cross-sectional view of the seat back ventilation structure of FIG. 2, taken along line B-B'. Particularly, FIGS. 3 and 4 illustrate flow of cooling air in the ventilation seat for vehicles. Further, for convenience of description, FIG. 2 illustrates only a pad stacked on a ventilation mat, and FIGS. 3 and 4 illustrate a cover and air permeable filter foam stacked on the pad.

As exemplarily shown in FIGS. 2 to 4, the seat back ventilation structure of the ventilation seat for vehicles may include an exhaust air circulation structure to uniformly maintain ventilation performance of a seat back.

In the seat back ventilation structure of FIG. 2, a pad 120 may be stacked on a ventilation mat 110. The ventilation mat 110 is configured to have an external surface corresponding to the external appearance of the seat back. In connection with ventilation performance, an air intake 101 may be formed through the ventilation mat 110, and an air supply apparatus may be connected to the air intake 101. The air supply apparatus may be configured to include a blower to supply cooling air to the seat back.

Further, a channel 111 may be formed on the ventilation mat 110 so that air supplied from the air supply apparatus may flow in the channel 111, and ventilation holes 121 are located at positions of the pad 120 which may communicate with the channel 111.

The channel 111 is a flow path formed to be connected to the air intake 101 so that air inhaled through the air intake 101 may be distributed to a target cooling surface throughout the entire area of the seat back. Particularly, the channel 111 may have an 'H' shape, and the air intake 101 is connected to the center of the channel 111, as exemplarily shown in FIG. 2. Air inhaled through the air intake 101 located at the center of the channel 111 flows along the channel 111 branched off in four directions and is thus uniformly dispersed throughout the entire area of the seat back.

The pad 120 may be stacked on at least some areas of the ventilation mat 110. The pad 120 serves as a lid which is located on the channel 111 of the ventilation mat 110 and covers the channel 11, and as a guide which guides cooling air flowing through the channel 111 to the passenger. As exemplarily shown in FIG. 2, a plurality of ventilation holes 121 communicating with at least some regions of the channel 111 of the ventilation mat 110 may be formed through the pad 120. The pad 120 may close the channel 111 except areas of the channel where the ventilation holes 121 are disposed. The pad 120 may be formed of a sponge.

Therefore, the pad 120 may be formed to cover an area of the ventilation mat 110 provided with the channel 111, and the position of the pad 120 stacked on the ventilation mat 110 may be determined such that the ventilation holes 121 of the pad 120 are accurately aligned with the channel 111 of the ventilation mat 110.

As exemplarily shown in FIG. 2, the pad 120 may be disposed throughout the central area of the seat back corresponding to the upper back of a passenger, but the position of the pad 120 is not limited thereto. Particularly, if the channel 111 has an 'H' shape, exhaust holes 113 which will be described below may be disposed at the outside of the H-shaped channel 111, and be located so as not to overlap the pad 120.

Further, a covering layer is stacked on the pad 120, and such a covering layer functions as a layer actually forming the external appearance of the seat. Therefore, the covering layer may include a cover 140 formed of a material, such as leather or fabric, and fine holes may be formed through the cover 140 so that cooling air may be discharged to the passenger through the fine holes.

The covering layer may further include an air permeable filter foam 130 stacked between the cover 140 forming the external appearance of the seat and the pad 120. The air permeable filter foam 130 may perform an air permeating function and a cushioning function of a predetermined level, and particularly, supply cooling air supplied through the channel 111 and the ventilation holes 121 to the entire area of the seat back.

Therefore, as exemplarily shown in FIGS. 3 and 4, air supplied to the channel 111 of the ventilation mat 110 is transmitted to the covering layer through the ventilation holes 121 connected to the channel 111, and is discharged to the passenger through the fine holes of the cover 140 via the air permeable filter foam 130 of the covering layer.

In accordance with one embodiment of the present invention, at least one exhaust hole 113, which is spaced apart from the channel 111 of the ventilation mat 110 and communicates with the covering layer, is formed through the ventilation mat 110.

FIGS. 3 and 4 illustrate the overall flow of air exhausted through these exhaust holes 113. As exemplarily shown in FIGS. 3 and 4, air supplied through the air intake 101 is supplied to the covering layer through the channel 111 of the ventilation mat 110 and the ventilation holes 121, and the air supplied to the covering layer is discharged to the fine holes of the covering layer or continuously discharged through the exhaust holes 113 formed at the edge of the seat.

Therefore, cooling air transmitted to the covering layer is converted into high-temperature and high-humidity air through a heat exchange process with the passenger, and such high-temperature and high-humidity air is consistently discharged through the exhaust holes 113. Therefore, even if all the fine holes of the covering layer are closed by the passenger's body when the passenger is seated on the seat, high-temperature air may be consistently exhausted through the exhaust holes 113 formed through the ventilation mat 110. Thus, low cooling performance caused by retention of high-temperature air within the covering layer may be fundamentally solved.

Particularly, the exhaust holes 113 may be formed at the outside of the pad 120, and particularly, at a position where a frequency of contact with passengers is low and a relatively small load of a passenger is applied.

For example, a groove line 112 may be formed on the ventilation mat 110 along the outside of the pad 120, and the exhaust holes 113 may be formed on the groove line 112 of the ventilation mat 110.

The groove line 112 may include grooves which are continuously formed on the ventilation mat 110 to divide the curved outline of the seat back. The exhaust holes 113 may be placed not to overlap the pad 120.

If the exhaust holes 113 are formed on the groove line 112, the exhaust holes 113 may maintain the open state thereof even though the passenger seated on the seat takes any posture. Thus, warm air acquired through heat exchange with the passenger is not retained and is immediately discharged through the exhaust holes 113. Therefore, cooling performance of the ventilation seat may be consistently maintained.

The groove line 112 may include a pair of grooves 112b and 112c nearly vertically extending so as to surround the left and right sides of the passenger, and a groove 112a horizontally extending between the grooves 112b and 112c so as to correspond to the back of the passenger.

In the present disclosure, for convenience of description, the groove 112a horizontally extending so as to correspond to the back of the passenger refers to a first groove 112a. Among the grooves 112b and 112c vertically extending so as to surround the left and right sides of the passenger, the left groove 112b refers to a second groove 112b and the right groove 112c refers to a third groove 112c.

The exhaust holes 113 are formed through the ventilation mat 110, and the exhaust holes 113 may be properly disposed on each of the respective grooves, i.e., the first, second and third grooves 112a, 112b and 112c, so as to be spaced apart from each other by predetermined intervals.

For example, as exemplarily shown in FIG. 2, the exhaust holes 113 may be grouped into a first group formed on the first groove 112a located at the upper portion of the groove line 112, a second group formed on the second groove 112b extending from the upper portion to the lower portion of the left side of the groove line 112, and a third group formed on the third groove 112c extending from the upper portion to the lower portion of the right side of the groove line 112.

Here, an arrangement of the exhaust holes 113a of the first group and arrangements of the exhaust holes 113b of the second group and the exhaust holes 113c of the third group may be the same or different. In order to maintain uniform cooling performance, the exhaust holes 113a, 113b and 113c may be spaced apart from one another by predetermined intervals. For example, as exemplarily shown in FIG. 2, three exhaust holes 113b or 113c may be formed on each of the second and third grooves 112b and 112c, and intervals between the respective exhaust holes 113b or 113c may be uniformly maintained. However, the intervals between the respective exhaust holes 113b or 113c may not be uniformly maintained necessarily. Further, an interval between the exhaust holes 113b or 113c at a position determined as requiring higher cooling performance than other positions through analysis may be shortened.

Further, differently from FIG. 2, each group may include one exhaust hole, and any exhaust hole may not be formed on some grooves.

Figure 5A:
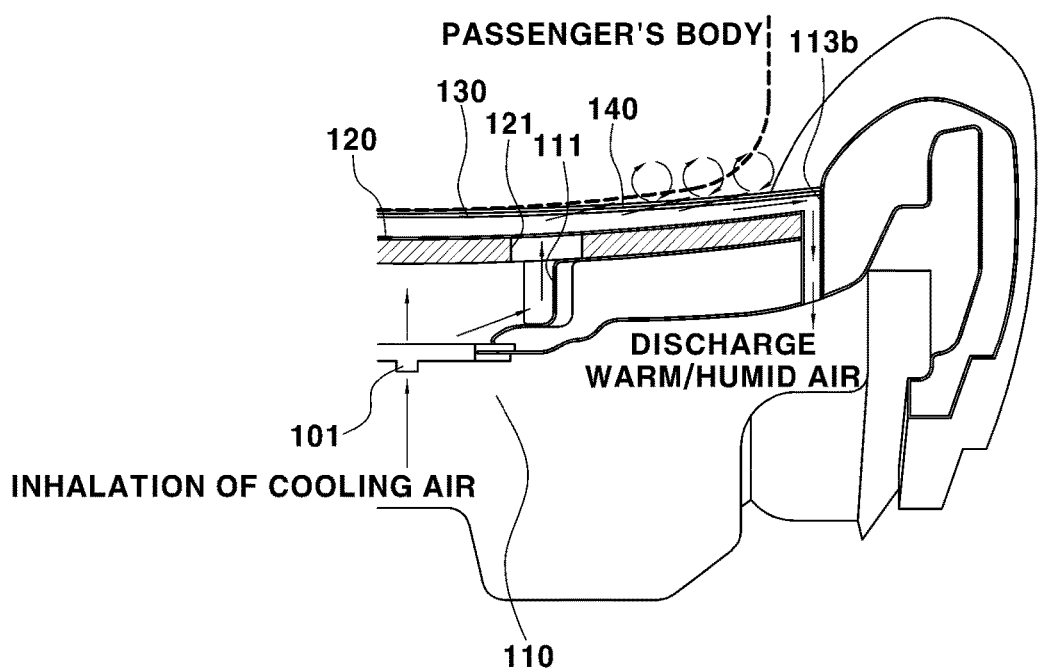
FIGS. 5A and 5B are views illustrating heat transfer and air exhaust states when a passenger sits on the ventilation seat.
Figure 5B:
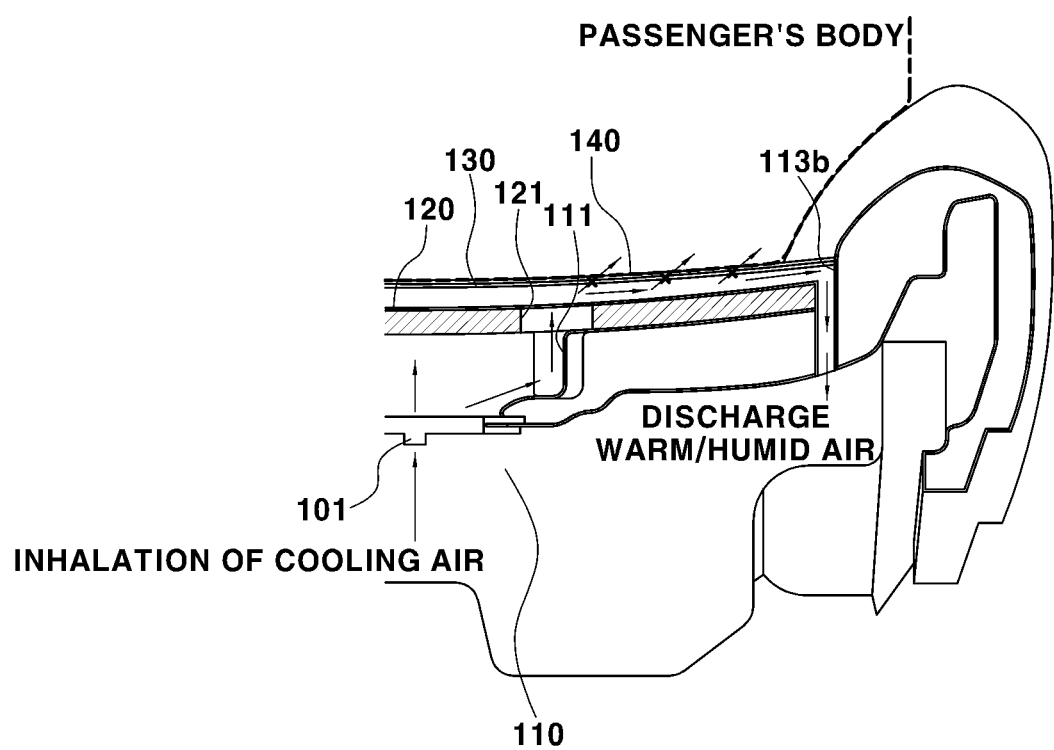

FIGS. 5A and 5B are provided to describe the effects of the ventilation seat for vehicles in accordance with one embodiment of the present disclosure, and each figure illustrates heat transfer and air exhaust states when a passenger sits on the seat.

First, FIG. 5A illustrates a state in which a passenger's body is not in complete contact with a seat surface. This indicates that air may be discharged through the fine holes formed through the cover 140. Therefore, in FIG. 5A, cooling air flowing through the air permeable filter foam 130 is directly discharged to the passenger's body, or a part of heat-exchanged air is not retained in the air permeable filter foam 130 and is completely exhausted through the exhaust holes 113.

On the other hand, FIG. 5B illustrates a state in which a passenger's body is in complete contact with the seat surface. This denotes that the fine holes of the covering layer are completely closed by the passenger's body, and thus discharge of air through the fine holes is restricted. However, in accordance with the embodiment of the present disclosure, the exhaust holes 113 communicating with the covering layer are formed, and an air circulation structure through the exhaust holes 113 may be ensured. Therefore, even if the fine holes of the covering layer are completely closed, a circulation flow path in the seat is not closed, a designated flow rate or more of air may be consistently exhausted through the exhaust holes 113, and thereby, cool air discharge performance of the ventilation seat may be consistently maintained.

As is apparent from the above description, in a ventilation seat for vehicles having a seat back exhaust hole structure in accordance with the one embodiment of the present disclosure, a flow path in which air flow circulation may be consistently performed is ensured, and thus, warm air acquired through heat exchange may be exhausted through exhaust holes and lowering of ventilation performance caused by retention of warm air in the flow path in the seat may be prevented.

Further, low-temperature air is supplied through ventilation holes, consistently passes through the rear surface of a covering layer, absorbs moisture and heat from a seating face and supplies cool air through heat transfer, and thereby passenger's thermal comfort may be improved.

The disclosure has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A ventilation seat for vehicles comprising:
 a ventilation mat comprising an air intake and a channel configured to move air inhaled through the air intake;
 a pad disposed on the ventilation mat, the pad comprising at least one ventilation hole configured to communicate with at least a part of the channel of the ventilation mat;
 a covering layer disposed on the pad, the covering layer configured to discharge the air moved through the at least one ventilation hole of the pad to the outside of a seat back; and
 at least one exhaust hole formed through the ventilation mat and spaced apart from the channel of the ventilation mat, the at least one exhaust hole configured to communicate with the covering layer, wherein the covering layer comprises:
 an air permeable filter foam disposed on the pad; and
 a cover configured to cover the air permeable filter foam and exposed to the outside,
 wherein a plurality of fine holes is formed through the cover.

2. The ventilation seat for vehicles of claim 1, wherein the pad covers the channel of the ventilation mat, and the pad is disposed on the ventilation mat such that the at least one ventilation hole is located on the channel of the ventilation pad.

3. The ventilation seat for vehicles of claim 1, wherein the pad close the channel of the ventilation mat except an area of the channel connected to the at least one ventilation hole.

4. A ventilation seat for vehicles comprising:
 a ventilation mat comprising an air intake and a channel configured to move air inhaled through the air intake;
 a pad disposed on the ventilation mat, the pad comprising at least one ventilation hole configured to communicate with at least a part of the channel of the ventilation mat;

a covering layer disposed on the pad, the covering layer configured to discharge the air moved through the at least one ventilation hole of the pad to the outside of a seat back; and at least one exhaust hole formed through the ventilation mat and spaced apart from the channel of the ventilation mat, the at least one exhaust hole configured to communicate with the covering layer, wherein:

a groove line is formed on the ventilation mat along an outside of the pad; and the at least one exhaust hole is formed on the groove line.

5. The ventilation seat for vehicles of claim 4, wherein there are a plurality of exhaust holes, wherein the exhaust holes are grouped into three groups:

a first group formed on a first groove located at an upper portion of the groove line;

a second group formed on a second groove extending from the upper portion to a lower portion of a left side of the groove line; and a third group formed on a third groove extending from the upper portion to a lower portion of a right side of the groove line;

wherein the at least one exhaust hole is located in one of the first group of exhaust holes, the second group of exhaust holes, or the third group of exhaust holes.

6. The ventilation seat for vehicles of claim 5, wherein the number of the exhaust holes of the first group is two or more, wherein each of the exhaust holes of the first group is spaced apart from each other by a first predetermined interval.

7. The ventilation seat for vehicles of claim 5, wherein the number of the exhaust holes of the second group is two or more, wherein each of the exhaust holes of the second group is spaced apart from each other by a second predetermined interval, wherein the number of the exhaust holes of the third group is two or more, wherein each of the exhaust holes of the third group is spaced apart from each other by the second predetermined interval.

8. A ventilation seat for vehicles comprising:

a ventilation mat comprising an air intake and a channel configured to move air inhaled through the air intake;

a pad disposed on the ventilation mat, the pad comprising at least one ventilation hole configured to communicate with at least a part of the channel of the ventilation mat;

a covering layer disposed on the pad, the covering layer configured to discharge the air moved through the at least one ventilation hole of the pad to the outside of a seat back; and at least one exhaust hole formed through the ventilation mat and spaced apart from the channel of the ventilation mat, the at least one exhaust hole configured to communicate with the covering layer, wherein the air supplied through the channel of the ventilation mat passes through the at least one ventilation hole and the covering layer and is continuously discharged through the at least one exhaust hole.

9. The ventilation seat for vehicles of claim 1, wherein the air supplied through the channel of the ventilation mat is moved to the air permeable filter foam via the at least one ventilation hole and is continuously discharged through the tine holes of the cover or the at least one exhaust hole.

10. The ventilation seat for vehicles of claim 1, wherein an air supply apparatus configured to supply air to the air intake is connected to the ventilation mat.

11. The ventilation seat for vehicles of claim 1, wherein the channel is substantially H-shaped, wherein the air intake is located at the center of the H-shaped channel.

12. The ventilation seat for vehicles of claim 11, wherein the at least one exhaust hole is disposed at the outside of the H-shaped channel, and is located not to overlap the pad.

* * * * *